(12) United States Patent
Bui et al.

(10) Patent No.: US 7,190,718 B2
(45) Date of Patent: Mar. 13, 2007

(54) METHOD AND APPARATUS FOR DETERMINING A RECEIVER SAMPLING PHASE FOR USE IN DIAGNOSING A CHANNEL

(75) Inventors: Sang T Bui, Irvine, CA (US); Mark Berman, Newport Coast, CA (US); Oscar E Agazzi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 725 days.

(21) Appl. No.: 10/281,992

(22) Filed: Oct. 29, 2002

(65) Prior Publication Data

US 2004/0013208 A1    Jan. 22, 2004

Related U.S. Application Data

(60) Provisional application No. 60/396,127, filed on Jul. 17, 2002.

(51) Int. Cl.
*H04B 3/46* (2006.01)
*H04L 5/16* (2006.01)
*H04H 7/30* (2006.01)

(52) U.S. Cl. ............... 375/224; 375/219; 375/233

(58) Field of Classification Search ............ 375/232, 375/231, 326, 350, 219, 222, 229, 230, 233, 375/316, 340, 355, 224–228, 257, 234; 455/63.1; 333/28 R, 18; 702/57, 66, 69; 370/241, 370/242, 252
See application file for complete search history.

(56) References Cited

U.S. PATENT DOCUMENTS

| | | | | |
|---|---|---|---|---|
| 3,962,637 A | * | 6/1976 | Motley et al. | ............... 375/232 |
| 4,539,675 A | * | 9/1985 | Fisher | ................... 370/291 |
| 4,547,633 A | | 10/1985 | Szechenyi et al. | |
| 4,677,647 A | | 6/1987 | Aoyagi | |

(Continued)

FOREIGN PATENT DOCUMENTS

EP    0 268 391 A1    5/1988

(Continued)

OTHER PUBLICATIONS

Maier, F.A. and Seeger, H., "Automation of optical time-domain reflectometry measurements." *Hewlett-Packard Journal*, v46, n1, p. 57(6), 4-Page Reprint, (Feb. 1995).

(Continued)

*Primary Examiner*—Tesfaldet Bocure
(74) *Attorney, Agent, or Firm*—Sterne, Kessler, Goldstein & Fox P.L.L.C.

(57) ABSTRACT

An apparatus for processing a received signal includes an analog-to-digital converter (ADC) configured to produce a sampled signal from a received signal using a candidate sampling phase. An adaptive filter includes adaptive filter coefficients and is configured to receive the sampled signal and converge the filter coefficients based on the candidate sampling phase. A controller includes a module for comparing the converged filter coefficients to filter coefficient thresholds, and a module for determining a largest filter coefficient among one or more excessive filter coefficients that exceed one or more corresponding filter coefficient thresholds. The apparatus is stepped through multiple candidate sampling phases. A best sampling phase is selected based on the largest filter coefficients associated with the candidate sampling phases.

15 Claims, 11 Drawing Sheets

U.S. PATENT DOCUMENTS

| | | | |
|---|---|---|---|
| 4,789,994 A | 12/1988 | Randall et al. | |
| 4,859,951 A | 8/1989 | Cole et al. | |
| 5,099,436 A | 3/1992 | McCown et al. | |
| 5,155,742 A * | 10/1992 | Ariyavisitakul et al. | 375/231 |
| 5,166,954 A | 11/1992 | Grizmala et al. | |
| 5,210,774 A * | 5/1993 | Abbiate et al. | 375/232 |
| 5,351,247 A | 9/1994 | Dow et al. | |
| 5,448,369 A * | 9/1995 | Lee et al. | 386/123 |
| 5,481,195 A | 1/1996 | Meyer | |
| 5,481,564 A | 1/1996 | Kakuishi et al. | |
| 5,661,668 A | 8/1997 | Yemini et al. | |
| 5,751,766 A | 5/1998 | Kletsky et al. | |
| 5,872,815 A * | 2/1999 | Strolle et al. | 375/321 |
| 6,055,119 A * | 4/2000 | Lee | 360/51 |
| 6,061,393 A | 5/2000 | Tsui et al. | |
| 6,160,673 A * | 12/2000 | Izumi et al. | 360/46 |
| 6,226,356 B1 | 5/2001 | Brown | |
| 6,233,274 B1 | 5/2001 | Tsui et al. | |
| 6,278,730 B1 | 8/2001 | Tsui et al. | |
| 6,385,237 B1 | 5/2002 | Tsui et al. | |
| 6,385,561 B1 | 5/2002 | Soraghan et al. | |
| 6,414,990 B1 | 7/2002 | Jonsson et al. | |
| 6,434,233 B1 * | 8/2002 | Bjarnason et al. | 379/406.01 |
| 6,448,781 B1 | 9/2002 | Frank et al. | |
| 6,529,549 B1 | 3/2003 | Norrell et al. | |
| 6,534,996 B1 | 3/2003 | Amrany et al. | |
| 6,590,930 B1 * | 7/2003 | Greiss | 375/224 |
| 6,650,699 B1 | 11/2003 | Tierno | |
| 6,650,768 B1 | 11/2003 | Evans et al. | |
| 6,661,761 B2 * | 12/2003 | Hayami et al. | 369/59.21 |
| 6,674,518 B1 | 1/2004 | Asher et al. | |
| 6,697,768 B2 | 2/2004 | Jones et al. | |
| 6,744,854 B2 | 6/2004 | Berrier et al. | |
| 6,833,875 B1 * | 12/2004 | Yang et al. | 348/665 |
| 6,856,655 B1 * | 2/2005 | Garcia | 375/326 |
| 6,901,243 B2 * | 5/2005 | Jayaraman et al. | 455/63.1 |
| 6,934,655 B2 | 8/2005 | Jones et al. | |
| 6,985,521 B1 | 1/2006 | Rezvani et al. | |
| 2002/0114383 A1 | 8/2002 | Belge et al. | |
| 2002/0161539 A1 | 10/2002 | Jones et al. | |
| 2002/0161542 A1 | 10/2002 | Jones et al. | |
| 2002/0168001 A1 | 11/2002 | Ramsey | |
| 2002/0169585 A1 | 11/2002 | Jones et al. | |
| 2003/0018981 A1 | 1/2003 | Ramsey | |
| 2003/0152180 A1 | 8/2003 | Schenk | |
| 2003/0210752 A1 | 11/2003 | Krupka | |
| 2004/0013178 A1 | 1/2004 | Bui et al. | |
| 2004/0019443 A1 | 1/2004 | Jones et al. | |
| 2004/0022195 A1 | 2/2004 | Chen | |
| 2004/0032921 A1 | 2/2004 | Bui | |
| 2004/0044489 A1 | 3/2004 | Jones et al. | |
| 2006/0007991 A1 | 1/2006 | Wang et al. | |
| 2006/0007992 A1 | 1/2006 | Wang et al. | |
| 2006/0007993 A1 | 1/2006 | Wang et al. | |
| 2006/0067239 A1 | 3/2006 | Olinski | |

FOREIGN PATENT DOCUMENTS

| | | |
|---|---|---|
| WO | WO 01/030013 | 8/2002 |

OTHER PUBLICATIONS

Navaneethan, S. et al., "Automatic Fault Location for Underground Low Voltage Distribution Networks," *IEEE Transactions On Power Delivery*, vol. 16, No. 2, pp. 346-351 (Apr. 2001).

European Search Report for European Patent Appl. No. 03016209.3, 3 pages, dated Sep. 27, 2005.

Bellanger, M.G., *Adaptive Digital Filters and Signal Analysis*, 1987, pp. 313-14.

* cited by examiner

METHOD AND APPARATUS FOR DETERMINING A RECEIVER SAMPLING PHASE FOR USE IN DIAGNOSING A CHANNEL

CROSS-REFERENCE TO RELATED APPLICATIONS

This application claims priority to U.S. Provisional Application No. 60/396,127, entitled "Cable Diagnostic System and Method," filed Jul. 17, 2002, incorporated herein by reference in its entirety.

BACKGROUND

1. Field of Invention

The present invention relates generally to communication devices and related methods, and more particularly, to such a device using an adaptive filter.

2. Related Art

A known communication system includes a pair of transceivers that communicate with each other over a communication channel, such as a wire or optical cable. On occasion, a fault in the communication channel inhibits communication between the transceivers. It is desirable to be able to determine whether such a fault exists. If such a channel fault exists, it may be difficult to determine useful information about the fault upon basic inspection, such as its location in the channel. Thus, it is also desirable to be able to determine information about the fault, such as its location in the channel. It is also desirable to be able to determine other information about the communication channel, such as the length of the channel in the absence of a fault. It is also desirable to be able to determine the above-mentioned information about the channel without having to examine the channel physically.

A known receiver includes an analog-to-digital converter (ADC) for sampling a receive signal in accordance with a sample clock having a sample clock phase, to produce a digitized receive signal. An adaptive filter, in a demodulator following the ADC, adaptively filters the digitized signal. Typically, the sample clock phase affects the performance of the adaptive filter. Therefore, it is desirable to set the sample clock phase to a phase value that maximizes performance.

BRIEF SUMMARY OF THE INVENTION

An embodiment of the present invention includes a method of processing a received signal in an apparatus, such as a receiver or a transceiver. The apparatus includes an adaptive filter including adaptive filter coefficients. The method comprises:

(a) producing a sampled signal from the received signal using a candidate sampling phase;

(b) converging the filter coefficients based on the candidate sampling phase;

(c) comparing the converged filter coefficients to filter coefficient thresholds; and (d) determining, based on said comparing step (c), a largest filter coefficient among one or more excessive filter coefficients that exceed corresponding coefficient thresholds.

The method further comprises:

(e) repeating steps (a), (b), (c) and (d) using different candidate sampling phases, thereby determining one or more largest filter coefficients for one or more respective candidate sampling phases; and (f) selecting as a best sampling phase the candidate sampling phase corresponding to a largest one of all of the largest filter coefficients.

The best sampling phase is then used by the apparatus, such as the receiver, while the apparatus performs a method of diagnosing a channel coupled to the apparatus.

Another embodiment relates to the apparatus, such as the receiver or the transceiver, used to perform the method.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention. In the drawings, like reference numbers indicate identical or functionally similar elements.

DETAILED DESCRIPTION OF THE INVENTION

Figure 1:
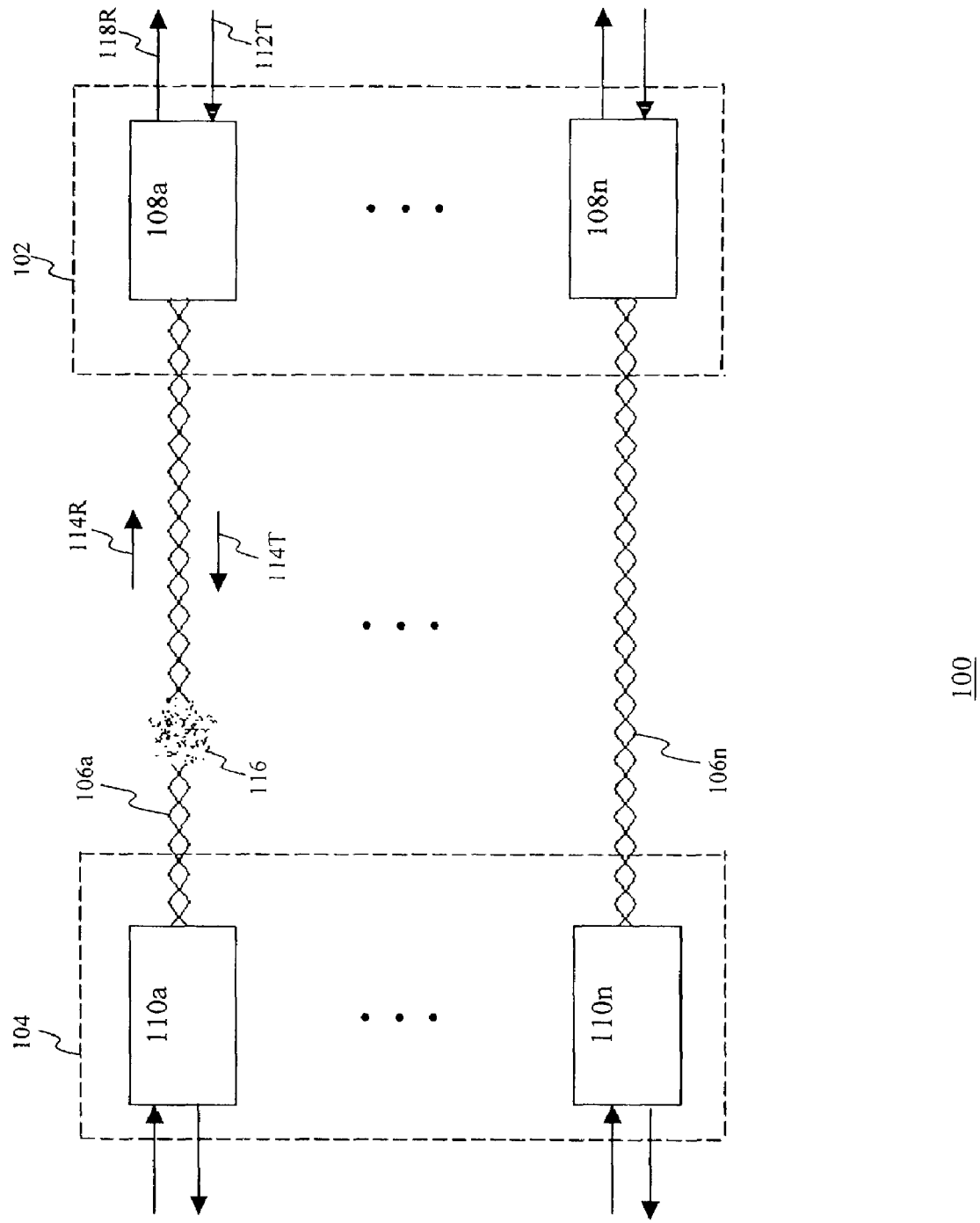
FIG. 1 is a block diagram of an example communication system in which the present invention can operate.

FIG. 1 is an example communication system 100 in which the present invention can operate. System or environment 100 includes a transmitter/receiver (transceiver) assembly 102 and a transceiver assembly 104, that communicate with each other over communication channels 106a–106n. Transceiver assembly 102 includes transceivers 108a–108n, coupled respectively to communication channels 106a–106n. Transceiver assembly 104 includes transceivers 110a–110n respectively coupled to communication channels 106a–106n. Communication channels 106 may include wire and/or optical cables. The terms "channel" and "cable" are used equivalently and interchangeably herein.

In operation, transceiver 108a receives an input symbol stream 112T from an external data source, not shown. Transceiver 108a generates a transmit symbol stream or signal 114T from input symbol stream 112T, and transmits the symbol stream to corresponding transceiver 110a over communication channel 106a. Transceivers 108a and 110a are said to be communication "link partners," because they establish a communication link between, and then communicate with, each other over communication channel 106a.

Transceiver 108a receives a receive signal 114R from communication channel 106a. Receive signal 114R may include a transmit signal originated from transceiver 110a. Additionally and/or alternatively, receive signal 114R represents energy from transmit signal 114T that has been reflected back toward transceiver 108a. Transmit signal 114T may be reflected from a channel fault 116 in channel 106a (such as a break in the channel) and/or from an impedance mismatch at a coupling section between channel 106a and transceiver assembly 104. Such reflected energy represents an "echo."

Transceiver 108a receives symbol stream 114R, and derives a corrected, adaptively filtered output stream 118R from symbol stream 114R.

Figure 2:
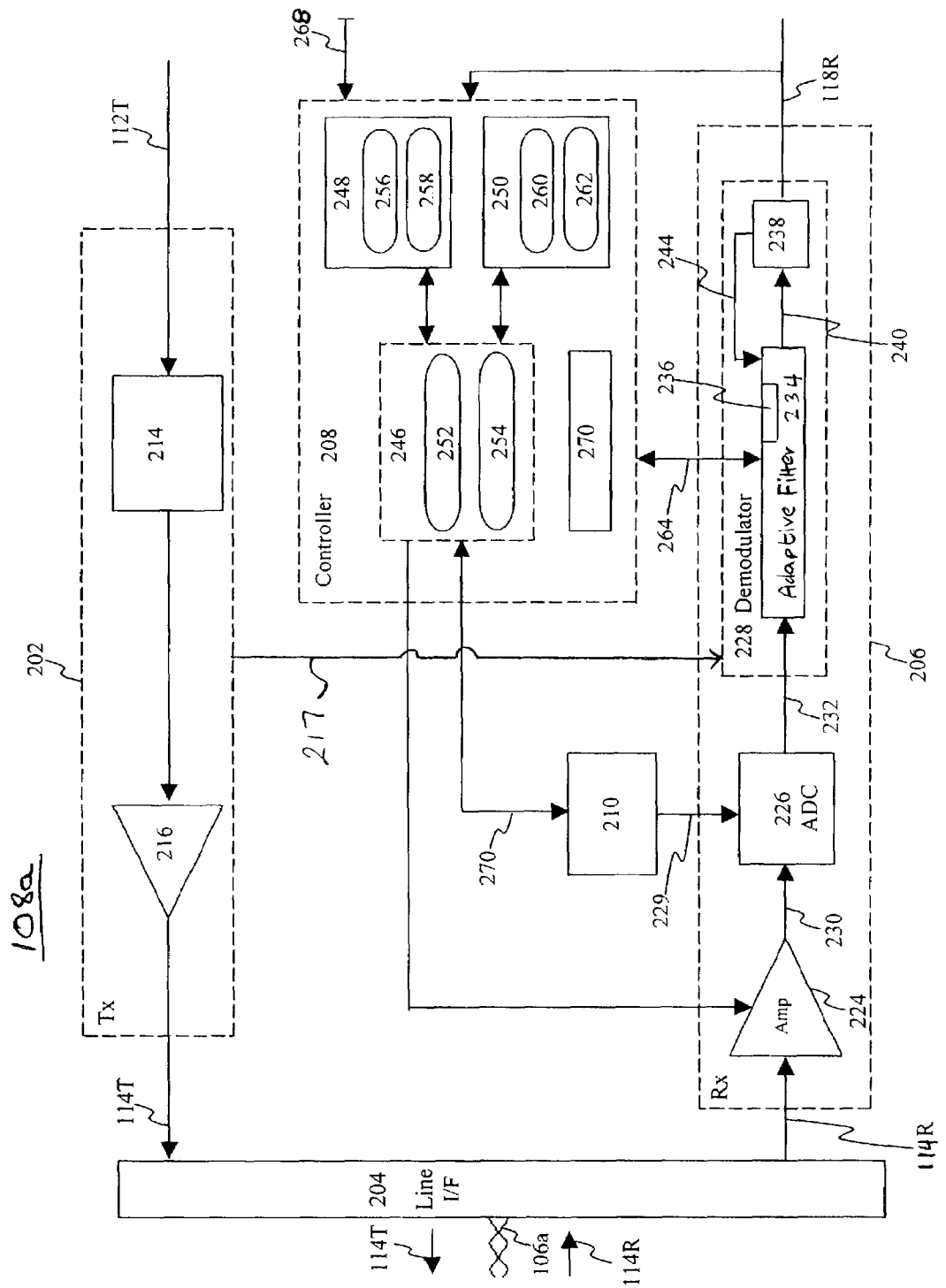
FIG. 2 is a block diagram of an example system, constructed and operated in accordance with the principles of the present invention, which expands on a transceiver of FIG. 1.

FIG. 2 is a block diagram of an example arrangement of transceiver 108a. Transceiver 108a includes a transmit path 202, a line interface 204, a receive path 206, a controller module 208, and a receive sample clock generator 210. Transmit path 202 includes a modulator 214 and a transmit amplifier 216. Together, modulator 214 and transmit amplifier 216 generate transmit symbol stream or signal 114T from input symbol stream 112T. Line interface 204 couples transmit signal 114T to communication channel 106a. Also, transmit path 202 provides a signal 217 representative of transmit symbol stream 114T to receive path 206. Signal 217 may be a digital signal or an analog signal representation of transmit signal 114T.

Line interface 204 couples receive signal 114R to receive path 206. Receive path 206 includes a variable gain amplifier 224, an analog-to-digital converter (ADC) 226, and a demodulator 228, connected in series. Amplifier 224 amplifies signal 114R, and provides an amplified receive signal 230 to ADC 226. ADC 226 samples signal 230 in accordance with an ADC sample clock 229, generated by sample clock generator 210, to produce a digitized receive signal 232.

ADC 226 provides signal 232 to demodulator 228. Demodulator 228 includes an adaptive filter 234 followed by a post-filtering stage 238. Demodulator 228 and adaptive filter 234 receive transmit replica signal 217 from transmit path 202. In the exemplary arrangement of transceiver 108a depicted in FIG. 2, adaptive filter 234 is coupled to communication channel 106a through components 204, 224 and 226. However, other arrangements for coupling the adaptive filter to the communication channel are possible, as would be apparent to one of ordinary skill in the relevant art(s) given the present description.

Adaptive filter 234 generally represents any number of adaptive signal processors including, but not limited to, an echo canceler and an equalizer. In a preferred arrangement of the present invention, adaptive filter 234 includes an adaptive echo canceler that uses transmit replica signal 217 to subtract-out echoes included in receive signal 114R. In another arrangement, adaptive filter 234 includes an adaptive equalizer that equalizes receive signal 114R. Adaptive filter 234 may operate as both an equalizer and an echo canceler, and may also provide adaptive filtering in addition to echo canceling and equalization. Thus, adaptive filter 234 may include at least one of an adaptive echo canceler and an adaptive equalizer. Further details regarding the operation of such signal processing elements are provided in co-pending U.S. Non-Provisional application Ser. No. 09/693,232, entitled DIAGNOSTICS OF CABLE AND LINK PERFORMANCE FOR A HIGH-SPEED COMMUNICATION SYSTEM, by O. Agazzi et al., filed Oct. 19, 2000, incorporated herein by reference in its entirety.

Adaptive filter 234 processes signal 232, in accordance with a set of adaptive filter coefficients 236 produced by the filter, to produce a processed (e.g., adaptively filtered) receive signal 240. Adaptive filter coefficients 236 generally represent adaptive filter, adaptive echo canceler, and/or adaptive equalizer coefficients, whereby adaptive filter 234 adaptively filters, adaptively echo cancels, and/or adaptively equalizes signal 232, respectively. Post-filtering stage 238 further processes signal 240 to produce corrected, adaptively filtered output stream 118R. Post-filtering stage 238 also derives a feedback error signal 244, and provides the error signal to adaptive filter 234.

Controller module 208 controls transceiver 108a. Controller module 208 includes controller logic 246, a memory 248 for storing a polynomial constant database, and a memory 250 for storing a threshold database. Controller logic 246 includes a channel diagnostic module 252 and a phase tuner and timing recovery module 254. The polynomial constant database stored in memory 248 includes a first set of polynomial constants 256 indicative of channel faults, and a second set of polynomial constants 258 indicative of channel length. Likewise, the threshold database stored in memory 250 includes a first set of thresholds 260 indicative of channel faults, and a second set of thresholds 262 indicative of channel length.

Controller logic 246 accesses the polynomial constant database stored in memory 248 and the threshold database stored in memory 250 as needed by channel diagnostic module 252 in order to execute methods of the present invention.

Controller logic 246 controls adaptive filter 234 through an interface 264. For example, controller 208 issues commands to filter 234, and accesses filter coefficients 236 through interface 264. Controller 208 stores filter coefficients in a controller memory 270.

Transceiver 108a includes a user interface 268 that supports user interaction with the transceiver through input/output (I/O) operations. For example, a user may program databases memories 248 and 250 through interface 268, and controller 208 may report test results to the user through the interface.

Controller 208 also controls sample clock generator 210 over an interface 270. For example, controller 208 issues sampling phase commands to generator 210 over interface 270. In turn, generator 210 generates sample clock 229 at sampling phases in accordance with the sampling phase commands. ADC 226 samples signal 230 in accordance with the sampling phases of clock 229 to produce sampled signal 232.

Controller 208 also controls the gain of variable gain amplifier 224.

Figure 3:
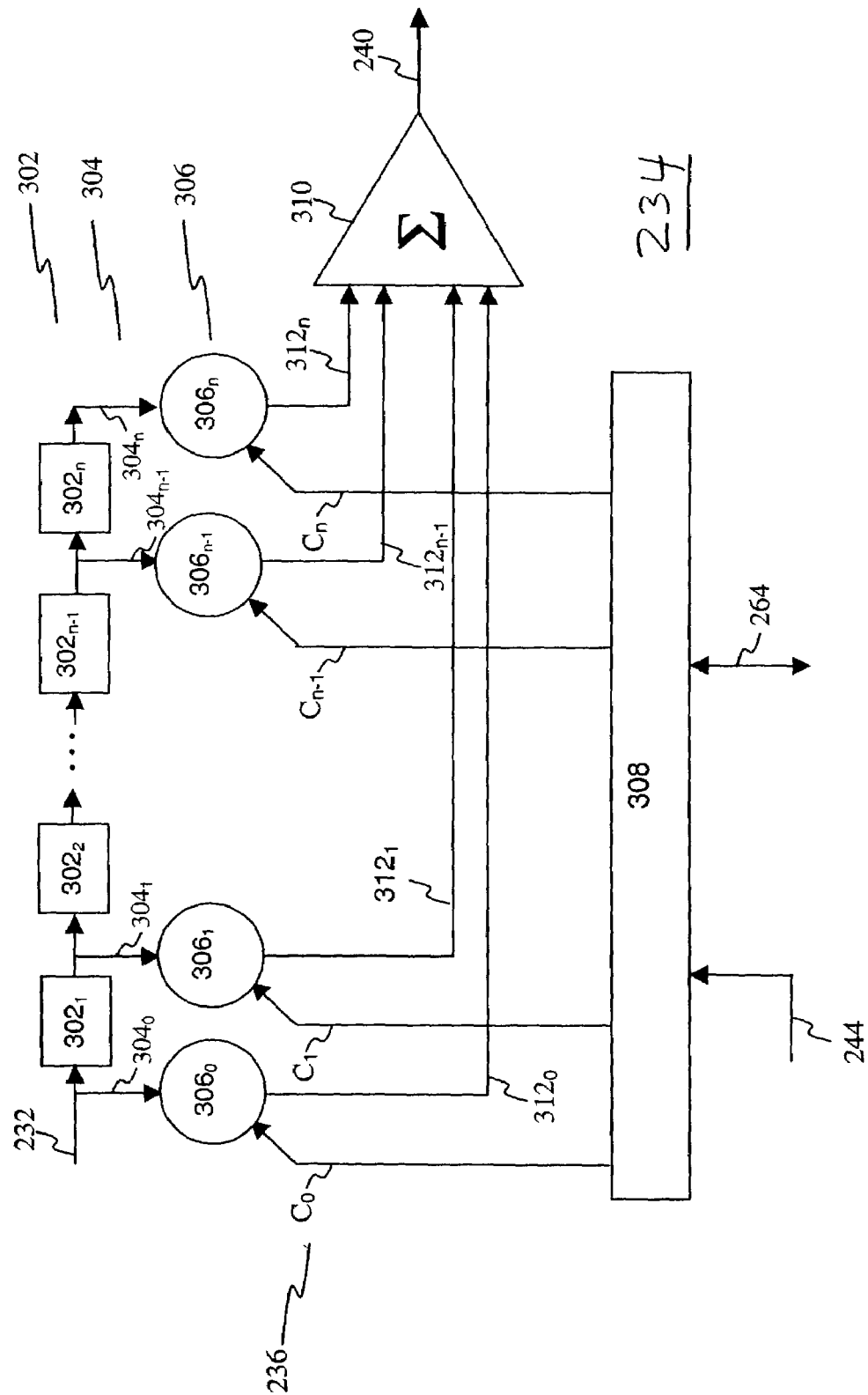
FIG. 3 is a block diagram of an example arrangement of an adaptive filter of FIG. 2.

FIG. 3 is a block diagram of an example arrangement of adaptive filter 234. Adaptive filter 234 includes a series of time delay elements 302, a set of signal taps 304 coupled to delay elements 302, a set of multipliers 306 coupled to taps 304, an adaptive coefficient adjustment module 308, and a summer 310. Time delay elements $302_1$–$302_n$ successively delay digitized receive signal 232 and feed taps $304_1$ to $304_n$ (where subscripts 1-$n$ indicate tap numbers) with successively delayed representations or portions of signal 232. As depicted in FIG. 3, non-delayed signal 232 feeds tap $304_0$ directly, while successively delayed representations or portions of signal 232 produced by delay elements $302_1$–$302_n$ feed respective taps $304_1$–$304_n$. Each tap $304_0$–$304_n$ feeds a respective one of multipliers $306_0$–$306_n$. With the example tap numbering convention adopted in FIG. 3, an increase in tap number corresponds to an increase in time delay in filter 234.

Module 308 generates adaptive filter coefficients 236 (labeled in FIG. 3 as filter coefficients $C_0$–$C_n$) based on feedback error signal 244, and provides each of the coefficients to a respective one of multipliers $306_0$–$306_n$, as depicted in FIG. 3.

Multipliers $306_0$–$306_n$ produce product signals $312_0$–$312_n$ based on filter coefficients $C_0$–$C_n$ and the respective successively delayed signals associated with taps $304_0$–$304_n$. Summer 310 sums product signals $312_0$–$312_n$ to produce processed signal 240.

Figure 4:
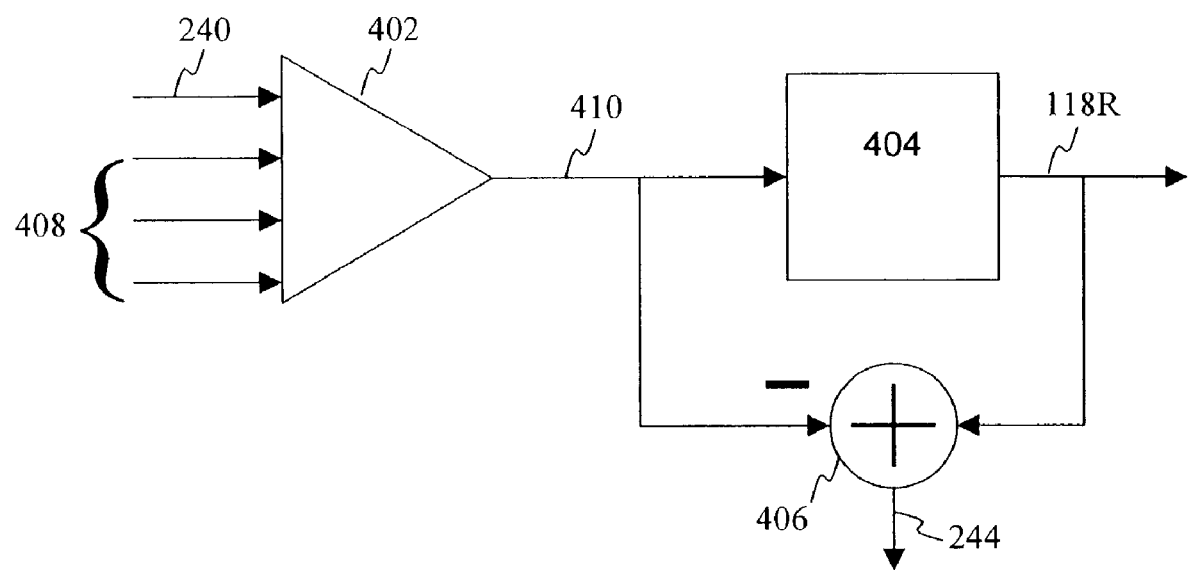
FIG. 4 is a block diagram of an example arrangement of a post filter stage of FIG. 2.

FIG. 4 is a block diagram of an example arrangement of post-filtering stage 238. In the depicted arrangement, a signal summer 402 sums processed signal 240 with signals 408 from other filters (not shown) to produce a "soft decision" signal 410. By "soft decision" it is meant that signal 410 may take on a range of different values, instead of just one of two logic values (for example, logic "1" and logic "0"). In an alternative arrangement, signals 408 are omitted. A slicer 404 processes soft decision signal 410 to produce corrected output stream 118R, including a stream of "hard decisions" (such as logic "1s" and logic "0s". Corrected output stream 118R includes hard decisions made by slicer 404. A comparator 406 compares soft decision signal 410 to corrected output stream 118R to produce feedback error signal 244.

Figure 5:
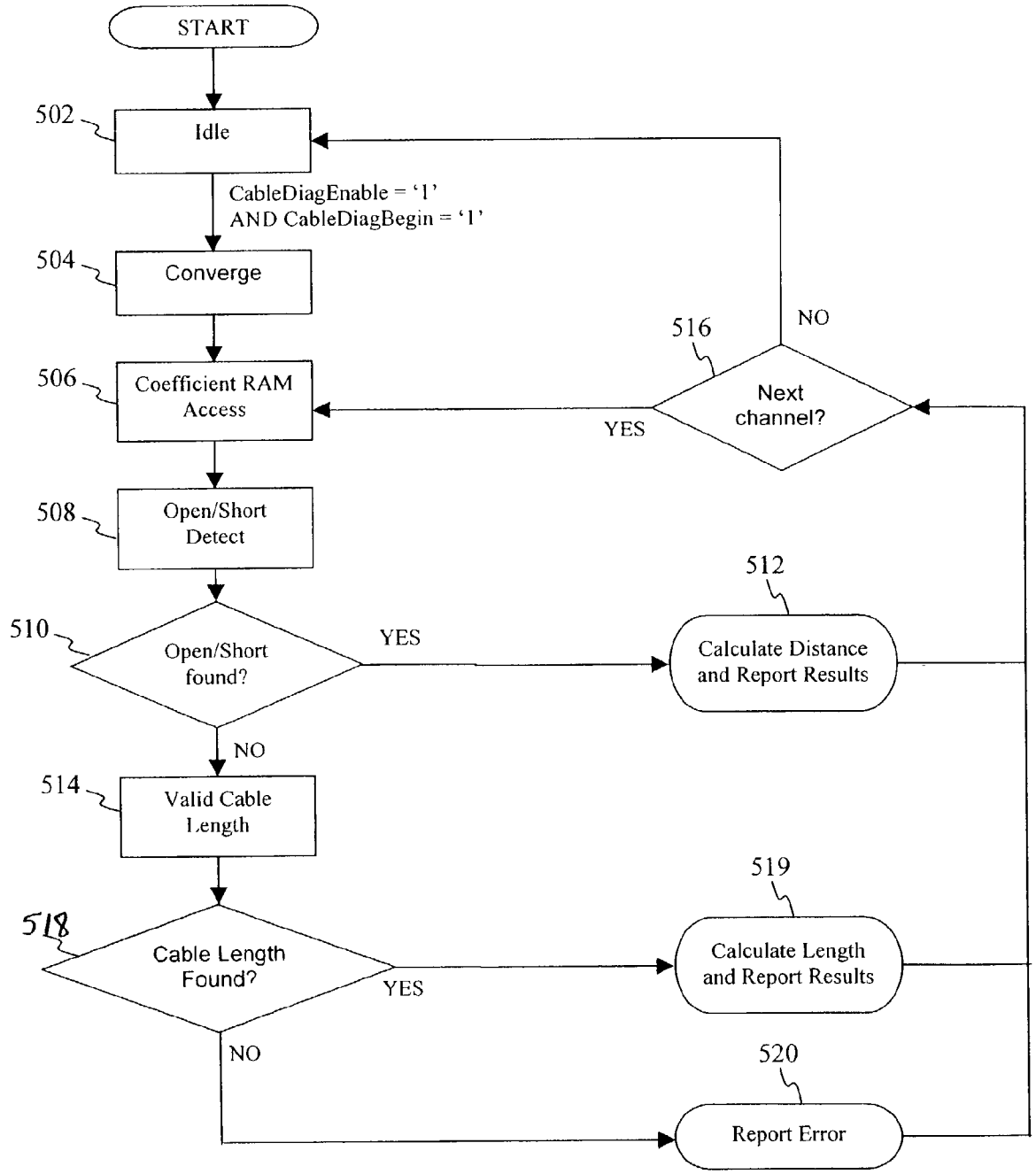
FIG. 5 is a flowchart of an example method of determining information about a channel based on filter coefficients and corresponding filter coefficient thresholds.
Figure 6:
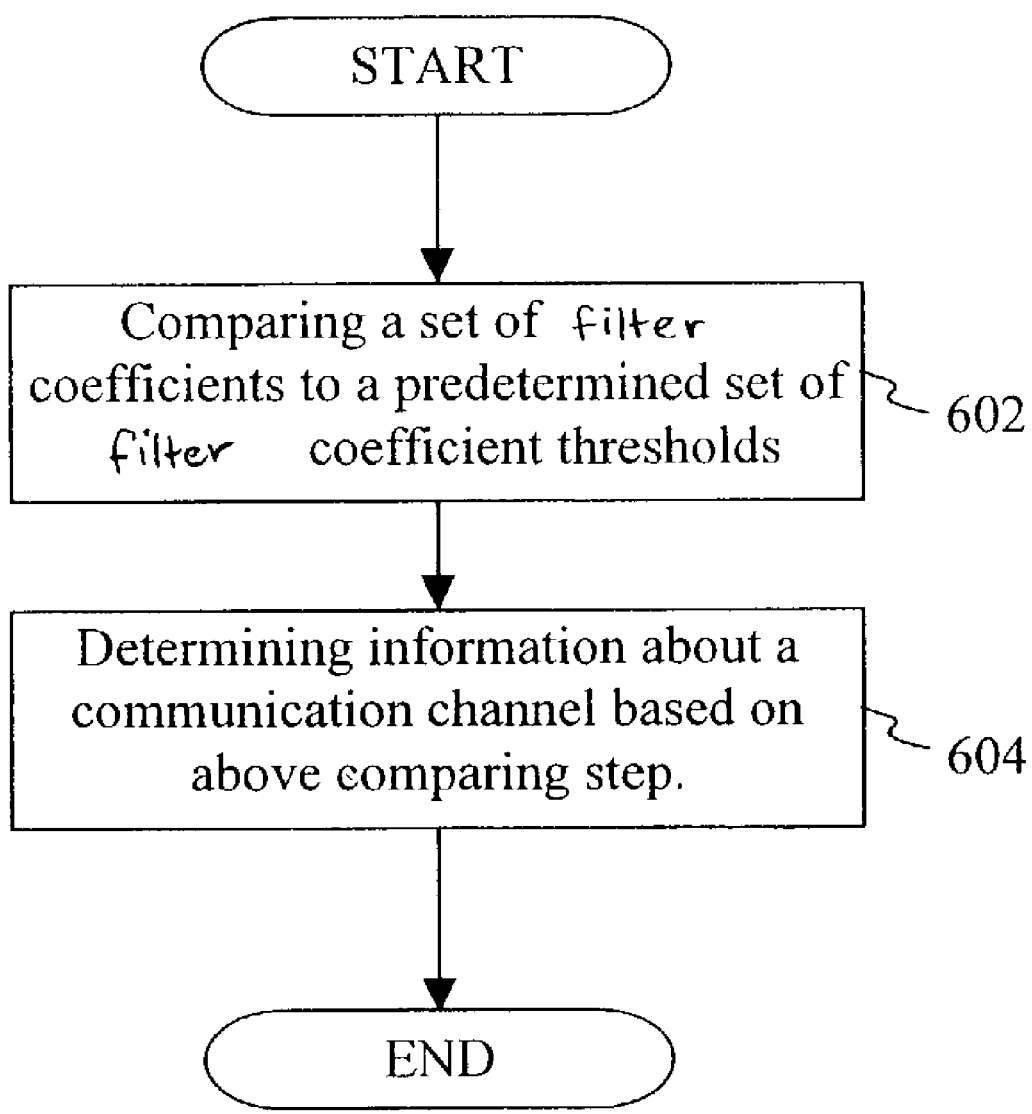
FIG. 6 is a flowchart of another example method of determining information about a communication channel.
Figure 7:
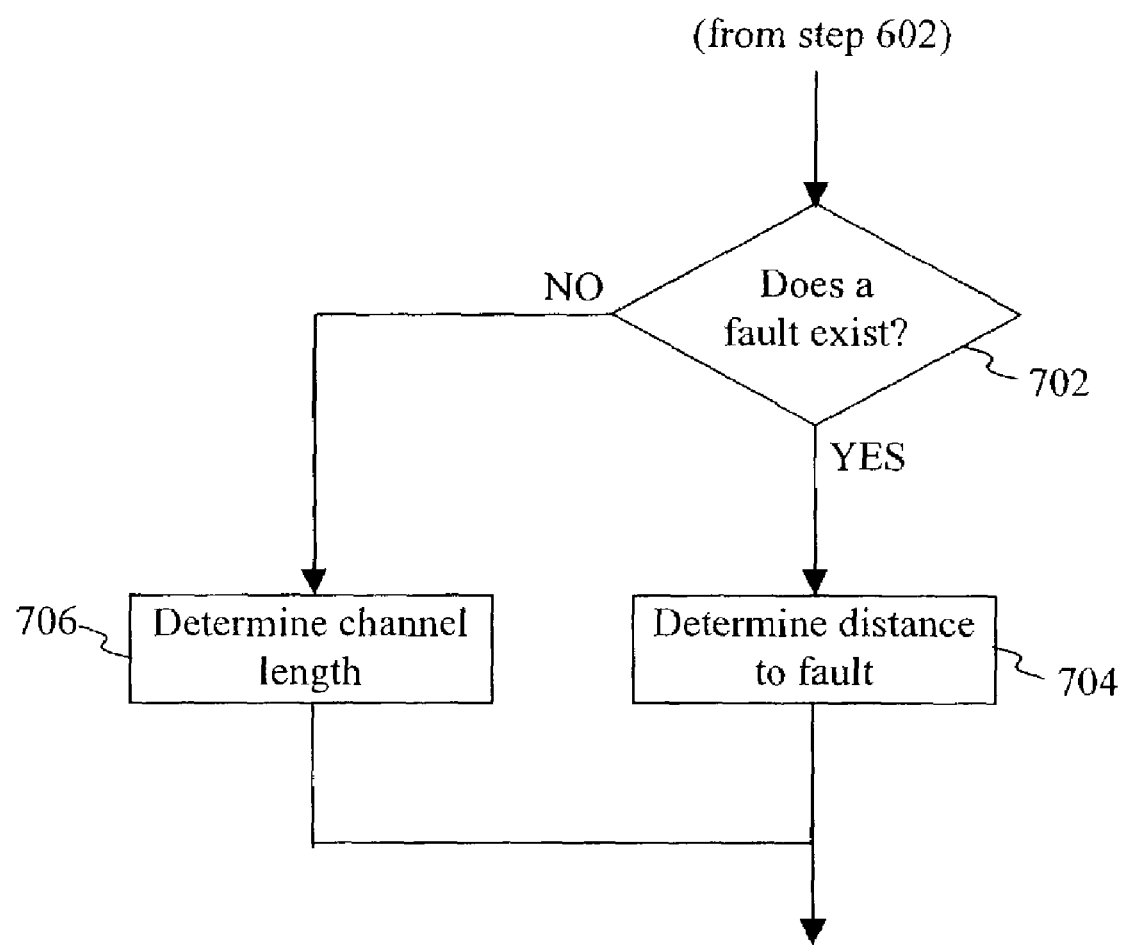
FIG. 7 is a flowchart further expanding on the method of FIG. 6.

Presented below in connection with FIGS. 5–7 are exemplary methods of determining information about a communication channel using an adaptive filter coupled to the channel, according to the present invention. The adaptive filter (for example, filter 234) reverses the negative effects of a noisy and distortive transmission medium (such as channel 106a). The output of the filter (for example, signal 240 or signal 118R) is a best-guess estimate of the symbol stream the link partner's transmitter sends (for example, the symbol stream transmitted by the transmitter in remote transceiver 110a). As described above, the filter includes a series of multiply-and-add stages (for example, components 306 and 310) that operate on the received data stream (for example, signal 232). Each multiplier (for example, multiplier $306_i$) has an associated filter coefficient (for example, filter coefficient $C_i$) that adapts itself to the characteristics of the received data stream such that the filter reverses the noise and distortion effects of the channel.

The methods described below use the series/set of filter coefficients mentioned above. According to the present invention, these filter coefficients adapt to channel conditions, and when interpreted properly, provide valuable information about the channel. For example, cable faults (including a severed connection or "open circuit," and a fused connection or "short circuit") can be determined by comparing the filter coefficients to a predetermined set of filter coefficient fault thresholds that set a limit on reasonable values of the filter coefficients corresponding to non-fault channel conditions. An abnormally enlarged filter coefficient that exceeds one such predetermined threshold indicates a fault in the channel. Also, a good approximation of the distance between the filter (in the transceiver) and such an indicated channel fault can be calculated based on the tap number corresponding to the enlarged coefficient. In addition, when no channel fault exists, a good approximation of the channel length can be determined by comparing the filter coefficients to a different set of predetermined thresholds indicative of channel length when no channel fault exists, and finding the tap number of any coefficient that exceeds one of these thresholds.

The filter coefficients exceed the above mentioned thresholds for the following reason. Channel faults (and similarly, the coupling between the end of the channel and the remote transceiver or link partner) cause an impedance mismatch in the channel. Thus, the fault (or channel-end coupling) returns substantial reflections of the transmitted signal, that originated at the transmitter (for example, transmitter 202), back to the adaptive filter (for example, adaptive filter 234). The adaptive filter attempts to remove the effects of the reflections or echoes by enlarging some of the filter coefficients. The longer the distance between the transceiver (for example, transceiver 108a) and the channel fault, the longer it takes for the reflection to return to the adaptive filter, and the larger the tap number(s) of the enlarged coefficients. Also, the longer the distance between the transceiver and the channel fault or coupling, the smaller the amplitude of the reflected signal, and the less the corresponding filter coefficient values are enlarged.

Another way of looking at this process is as follows. Under normal conditions, the adaptive filter receives the transmitted signal from its associated transmitter, as the line interface initially couples the transmitted signal to the channel. By storing delayed copies of the transmitted signal in the filter delay elements, and adjusting the corresponding coefficient-values, the adaptive filter adjusts to the "timing" of the transmitted signal in the channel. Such timing of the transmitted signal is inherently represented by the adapted filter coefficients.

With regard to channel length determinations, when an echo of the transmitted signal arrives at the adaptive filter relatively soon after the initial transmission of the transmitted signal, one or more of the relatively earlier filter coefficients (that is, filter coefficients corresponding to smaller tap numbers) will self-adjust to a larger coefficient value, that exceeds its respective threshold. The methods described below will then report that the cable is relatively short because of the "soon after" arrival of the echo.

On the other hand, when an echo of the transmitted signal arrives at the adaptive filter a relatively long time after the initial transmission of the transmitted signal, then one or more of the relatively later (larger tap number) filter coefficients will have a higher-than-normal value that exceeds the respective threshold, and the method will report a relatively longer cable length due to the later arrival of the echo.

FIG. 5 is a flowchart of an example method 500 of diagnosing one or more communication channels, such as channels 106a–106n depicted in FIG. 1, based on filter coefficients and corresponding filter coefficient thresholds. That is, method 500 determines information about the communication channels. By way of example, method 500 is described in the context of transceiver 108a. Method 500 may be implemented under control of controller 208 in the transceiver 108a.

Method 500 includes a first step 502 ("idle"). Idle is the state where the method is at rest.

In an example operational scenario, transceivers 108a and 110a attempt to establish a valid communication link between themselves, to enable communication over the valid link (and communication channel 106a). To do this, transceivers 108a and 110a traverse a communication link setup protocol. Typically, this includes exchanging initial hand-shaking signals, and verifying a valid link has been established, as would be apparent to one of ordinary skill in the relevant art(s).

When a valid link exists, filter coefficients $C_0$–$C_n$ (collectively referred to as filter coefficients C) have properly converged to settled coefficient values. That is, filter coefficients C have had sufficient time to adapt to, and therefore indicate, the characteristics and/or conditions of communication channel 106a. Thus, converged coefficients provide useful information about communication channel 106a.

In practice, a valid link may not exist between link partner transceivers 108a and 110a. For example, there may be a fault, such as a break, in communication channel 106a, or transceiver link partner 110a may not be connected to the communication channel. When a valid link does not exist, filter coefficients C can be in an indeterminate (non-converged) state, thus provide little or no useful information about channel 106a.

Method 500 overcomes or avoids indeterminate filter coefficients in a step 504 ("converge"). In step 504, controller 208 instructs adaptive filter 234, over interface 264, to converge filter coefficients C. In step 504, adaptive filter 234 performs a convergence, and filter coefficients C adapt properly to characteristics of channel 106a. Step 504 includes initializing the filter coefficients C to initial values, and then permitting the initialized coefficients to settle to converged values based on the receive signal (e.g., signal 232), for example, while adaptive filter 234 performs filtering, echo canceling, and/or equalization. After convergence, converged filter coefficients C indicate useful information about channel 106a. Note that step 504 is an optional step.

In a step 506 ("coefficient RAM Access"), controller 208 accesses converged filter coefficients C and stores them in memory 270 of the controller.

A next step 508 ("open/short detect") is a comparison step that is part of testing channel 106a for open or short channel fault conditions that may be caused, for example, by a break in the channel. This step includes comparing filter coefficients C to thresholds 260 indicative of channel faults (also referred to as open/short thresholds 260).

In an embodiment, step 508 includes comparing an absolute value of each of the filter coefficients C to a corresponding one of the open/short thresholds 260, sequentially beginning with the filter coefficient corresponding to the signal tap having the least amount of time delay (e.g., in the signal tap order $304_0$–$304_n$). This comparison searches for the first one of filter coefficients C that is found to exceed its corresponding one of the open/short thresholds 260. Such a filter coefficient would represent the existence of a fault. Processing the filter coefficients in an order of increasing tap number (i.e., time delay) identifies channel faults nearest transceiver 108a.

A next step 510 ("open/short found?") is a decision step. If step 508 detected a filter coefficient among filter coefficients C that exceeded its corresponding one of the open/short thresholds 260, then a channel fault (e.g., channel fault 116 in channel 106a) is identified, and step 510 returns a "YES" signal. Method 500 then proceeds to a step 512 ("calculate and report results"). If step 508 did not detect a coefficient representing the existence of a channel fault, then step 510 returns a "NO" signal and method 500 proceeds to a step 514 ("valid channel length").

Step 512 includes calculating a distance to the channel fault detected in step 508 and reporting the results over user interface 268. To determine the distance between transceiver 108a and channel fault 116, controller 208 determines the tap number (t) of the first one of the filter coefficients C that was found in step 508 to exceed its corresponding one of the open/short thresholds 260. Controller 208 processes the tap number (t) in accordance with the following:

$$A*t+B=\text{length}$$

where:
"*" represents the multiplier operator,
A and B are predetermined polynomial values in the first set of constants 256 indicative of channel faults,
t is the tap number corresponding to the coefficient that exceeds its corresponding one of the open/short thresholds 260, and
length is the distance from the transceiver/adaptive filter to the channel fault (e.g. channel fault 116).

The length can be reported over user interface 268. In addition, status flags may be set, such as status bits in a register associated with controller 208, indicating the fault process has completed and that a channel fault was found.

If a fault was not detected, then flow proceeds from step 510 to step 514, as mentioned above. Step 514 is a comparison step, wherein filter coefficients C are compared to thresholds 262 indicative of channel length (also referred to as length thresholds 262).

Step 514 is similar to step 508, except that the thresholds used are length thresholds 262. Also, filter coefficients C are compared to corresponding ones of length thresholds 262 in a reverse order with respect to the order of comparison of step 508. That is, the filter coefficients C are traversed sequentially beginning with the coefficient corresponding to the signal tap having the most amount of time delay (e.g., in the signal tap order $304_n$–$304_0$). If a filter coefficient is found to exceed its corresponding one of the length thresholds 262 then such a coefficient would be useful for calculating channel length in a later step (step 519, discussed below).

A next step 518 ("valid channel length?") is a decision step. If step 514 detected a filter coefficient among filter coefficients C that exceeded its corresponding one of the length thresholds 262 then step 518 returns a "YES" signal. Method 500 then proceeds to a step 519 ("calculate length and report results"). If step 514 did not detect a coefficient useful for calculating length, then step 518 returns a "NO" signal and method 500 proceeds to a step 520 ("report error").

In step 519, controller 208 determines the tap number (t) associated with the first coefficient that was found in step 514 to exceed its corresponding one of the length thresholds 262. Controller 208 processes the tap number (t) in accordance with the following:

$$C*t+D=\text{length}$$

where:
C and D are predetermined polynomial values in the second set of constants 258 indicative of channel length,
t is the tap number, and
length is the channel length (e.g. the length of channel 106a). The length can be reported to or accessed by a user through user interface 268. In addition, status flags may be set, such as bits in a register associated with controller 208, indicating that length has been determined and that no channel fault was found.

Step 520 includes reporting an error to user interface 268 if no filter coefficient among filter coefficients C is found to exceed its corresponding one of the length thresholds 262

After channel information has been determined in steps 512, 519, or after an error has been reported in step 520, flow proceeds to a next step 516 ("next channel?"). Step 516 includes determining whether a further non-diagnosed channel exists. For example, if only channel 106a has been diagnosed, channels 106b–106n are yet to be diagnosed. If a non-diagnosed channel exists, step 516 returns a "YES" signal and method 500 returns to step 506. If no non-diagnosed channel exists, step 516 returns a "NO" signal and flow returns to step 502. In the case of some Ethernet systems, for example, there are four wire pairs (that is, channels) connected to each transceiver, so method 500 continues to analyze the next three wire pairs in search of channel faults, until all four wire pairs (that is, channels) are completed. After all the channels are analyzed, flow returns to step 502.

Figure 5A:
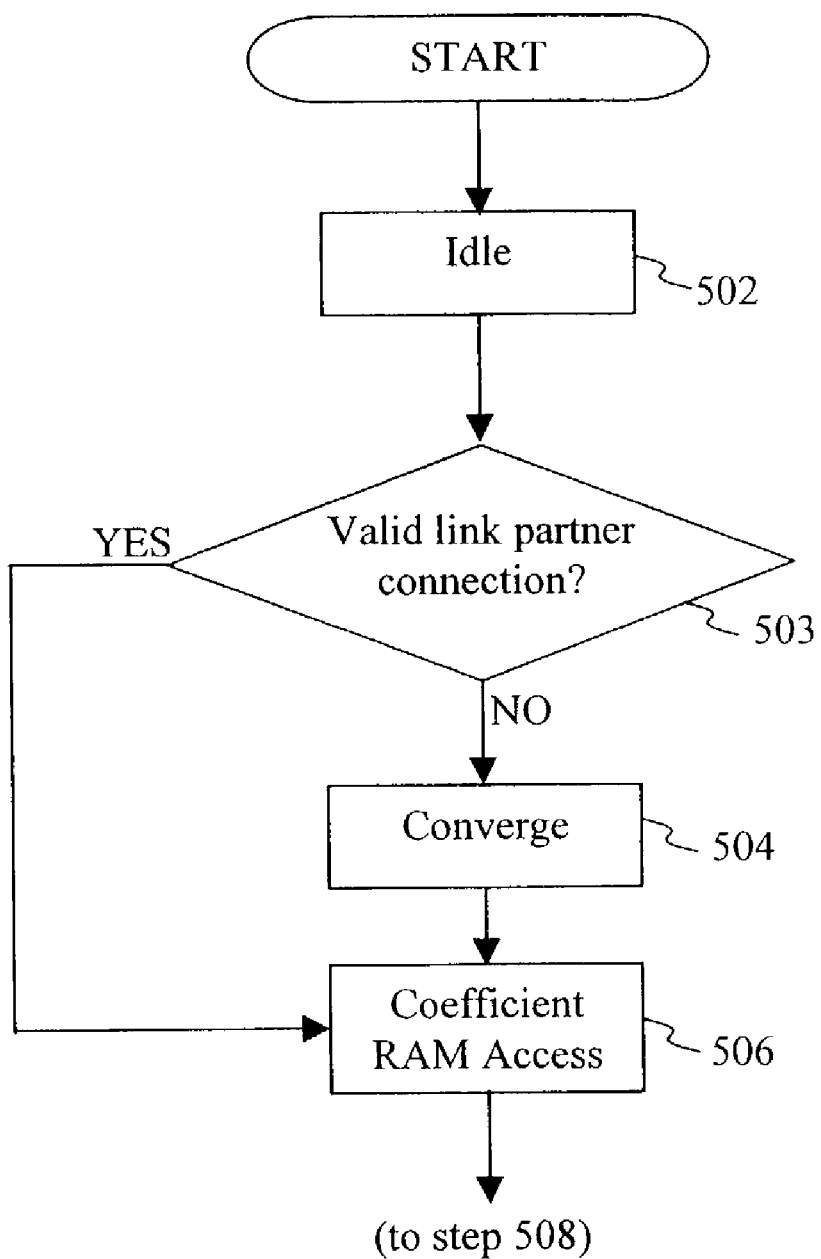
FIG. 5A is a flowchart of an alternative method related to the method of FIG. 5.

FIG. 5A is a flowchart of an alternate method 500A related to the beginning portion of method 500. This alternative method 500A is referred to as "the Natural Link" variation of method 500. Method 500A takes advantage of the fact that if a valid link has already been achieved, then filter coefficients C are guaranteed to be converged properly and thus information about the channel is readily available. Forcing a new convergence of the adaptive filter would not be beneficial, and could even result in a loss of receive data. Thus, the convergence step 504 may be skipped under such circumstances.

Thus, according to the method of 500A, a decision step 503 is inserted after idle step 502. If a valid communication link partner exists, step 503 returns a "YES" and flow skips to next step 506. That is, flow bypasses convergence step 504 of method 500. On the other hand, if a valid communication link partner does not exist, then step 503 returns a "NO" and flow continues to step 504.

When method 500A is enabled, the gain of variable gain amplifier 224 is maintained at a proper gain value, which in turn, decreases the absolute values of many of the filter coefficients C. In this case, a more uniform threshold can be applied to all the coefficients, instead of the stepped thresholds that are used for both the Open/Short and cable length comparisons/determinations discussed above.

FIG. 6 is a flowchart of another example method 600 of determining information about a communication channel. A first step 602 includes comparing the set of adaptive filter coefficients 236 to a predetermined set of filter coefficient thresholds, such as the first set of thresholds 260 indicative of fault, and/or the second set of thresholds 262 indicative of channel length. Step 602 corresponds to comparison step 508 or comparison step 514 of method 500.

Step 604 includes determining information about the channel based on comparing step 602. Step 604 corresponds to determining steps 510 and 512 or determining steps 518 and 519 of method 500. According to method 600, determining (i) channel faults and distances thereto, and (ii) channel length, may be considered as independent methods.

In an embodiment where step 604 corresponds to determining if a channel fault exists, step 604 includes determining a filter coefficient corresponding to a minimum time delay (that is, corresponding to a lowest tap number) among filter coefficients that exceed their respective threshold. For example, if more than one enlarged filter coefficients among filter coefficients C exceed their respective thresholds indicative of channel faults, then step 604 determines fault information based on the enlarged filter coefficient corresponding to the lowest time delay (that is, lowest tap number) among the enlarged filter coefficients.

In an embodiment where step 604 corresponds to determining channel length, step 604 includes determining a filter coefficient corresponding to a maximum time delay (that is, corresponding to a highest tap number) among filter coefficients that exceed their respective threshold. For example, if more than one enlarged filter coefficients among filter coefficients C exceed their respective thresholds indicative of channel length, then step 604 determines channel length based on the enlarged filter coefficient corresponding to the highest time delay (that is, highest tap number) among the enlarged filter coefficients.

FIG. 7 is a flowchart expanding on step 604. A decisions step 702 includes determining whether a channel fault exists based on comparison step 602. If a channel fault exists, step 702 returns a "YES" signal, and flow proceeds to a step 704. If no channel fault exists, step 702 returns a "NO" signal, and flow proceeds to a step 706.

Step 704 includes calculating a distance to the channel fault (and corresponds to step 512 in FIG. 5).

Step 706 includes calculating a channel length (and corresponds to step 519 in FIG. 5).

Figure 7A:
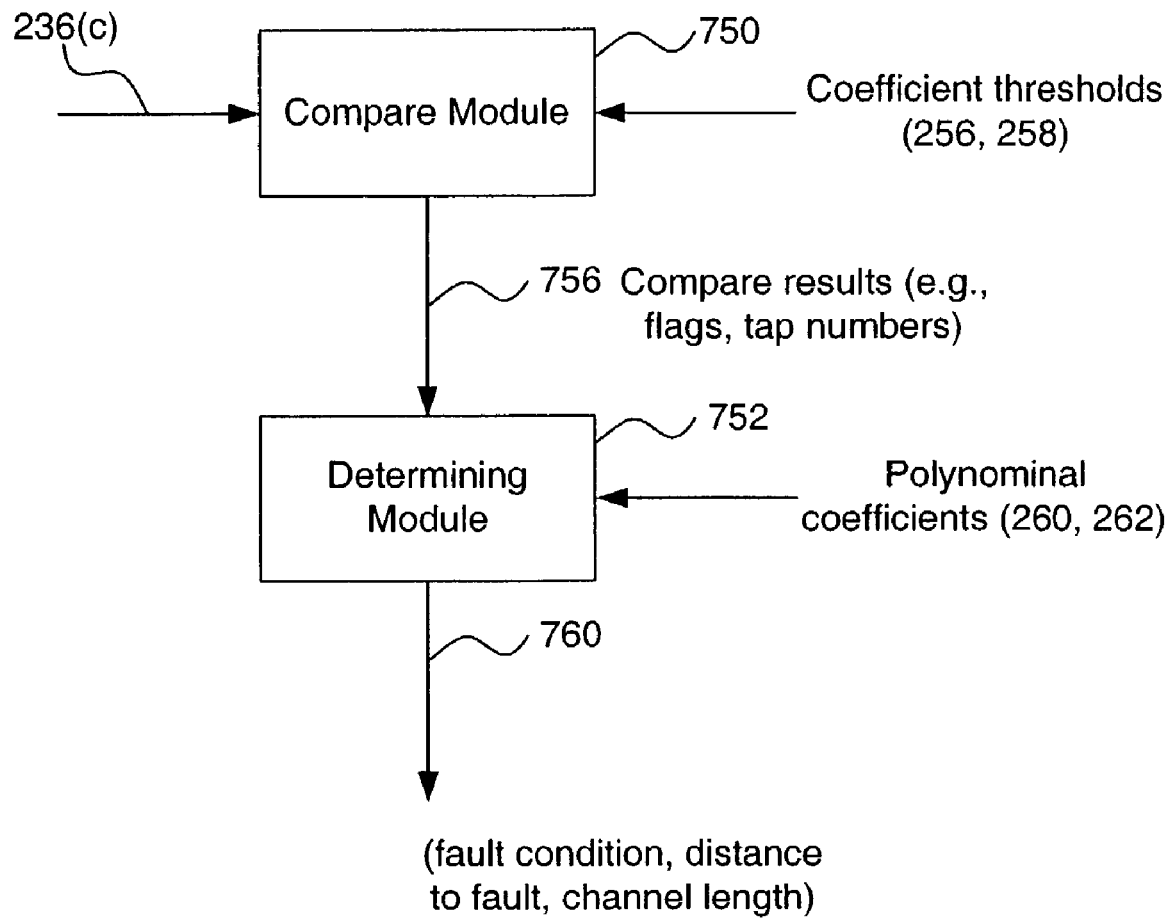
FIG. 7A is a block diagram of a diagnostic module in a controller of the transceiver of FIG. 2.

FIG. 7A is a block diagram of an example arrangement of diagnostic module 252 of controller 208. Module 252 includes a compare module 750 coupled to a determining module 752. Compare module 750 includes comparing logic (such as one or more comparators) for comparing filter coefficients C to corresponding members of the coefficient threshold sets 256 and 258, in the manner described above. Compare module 750 produces compare results 756 based on these comparisons. Compare results 756 may include flags indicating which, if any, of the filter coefficients exceed their respective thresholds, for example.

As inputs, determining module 752 receives compare results 756, polynomial coefficients from databases 260 and 262, and tap numbers corresponding to filter coefficients C. Based on these inputs, determining module 752 can determine whether a channel fault exists, the distance to such a fault, or the channel length, in the manner described above. Determining module 752 produces these determinations as a results signal 760.

Figure 8:
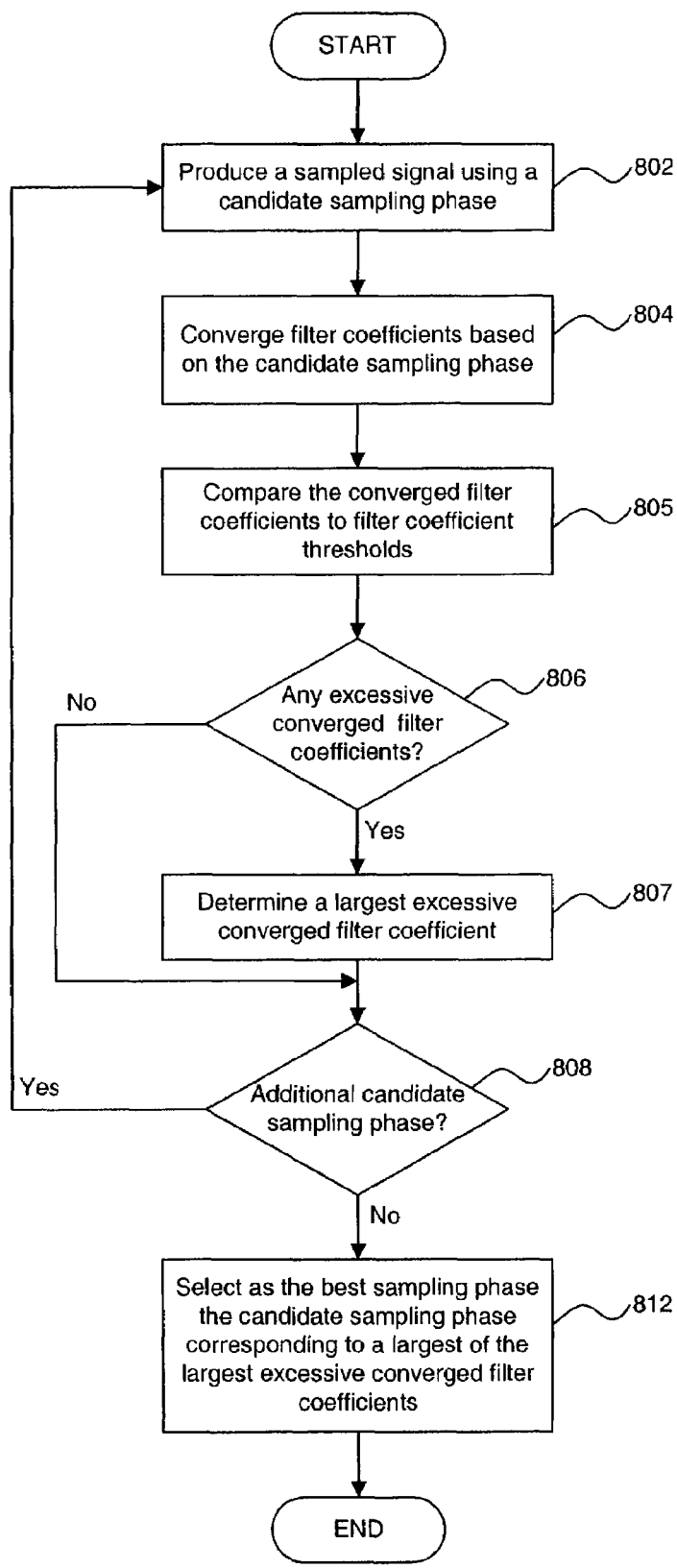
FIG. 8 is a flowchart of an example method of fine-tuning a received signal sampling phase in a transceiver based on filter coefficients.

FIG. 8 is a flowchart of an example method 800 of fine-tuning a received signal sampling phase in an individual transceiver, using a set of filter coefficients and a predetermined set of filter coefficient thresholds corresponding to the set of filter coefficients. Method 800 may be implemented in an apparatus, such as a receiver (for example, receive path 206), or more generally, a transceiver 108a, under the control of controller module 254.

A step 802 includes producing a sampled signal using a candidate sampling phase. For example, ADC 226 produces digitized signal 232 using a candidate sampling phase of sample clock 229.

A next step 804 includes converging a set of filter coefficients based on the candidate sampling phase. For example, this may involve initializing the set of filter coefficients 236, then allowing the set of filter coefficients 236 to adapt to the sampled signal having the candidate sampling phase. For example, adaptive filter 234 converges filter coefficients C based on receive signal 232, in response to a converge command from controller 208.

A next step 805 includes comparing each filter coefficient in the set of converged filter coefficients 236 to a corresponding filter coefficient threshold in the set of filter coefficient thresholds (e.g., thresholds 260 ), in a manner as discussed above, for example, as in methods 500 and 600.

A next step 806 is a decision step. Step 806 includes determining if any of converged filter coefficients 236 exceed their corresponding coefficient thresholds (e.g., thresholds 260), as indicated at step 805. Together, steps 805 and 806 comprise determining if any of converged filter coefficients 236 are excessive, that is, if they exceed their corresponding thresholds (e.g., thresholds 260). Controller 208 performs steps 805 and 806.

If there are any excessive converged filter coefficients, then flow proceeds to a next step 807. Otherwise, flow proceeds to a next step 808.

Step 807 includes determining a largest excessive converged filter coefficient among the excessive converged filter coefficients 236 determined at steps 805 and 806. For example, controller 208 determines a largest one of the excessive converged filter coefficients. This largest excessive coefficient corresponds to the candidate sampling phase used in step 802 to produce signal 232. Steps 802–807 alone are considered an independent method of processing a received signal in a receiver.

A next step 808 is a decision step. If there is an additional candidate sampling phase to be tested, step 808 returns a "YES" signal and flow returns to step 802. If all candidate sampling phases have been tested, then step 808 returns a "NO" signal and flow continues to a step 812.

Repetition of steps 802–808 produces one or more largest excessive converged filter coefficients corresponding to one or more respective candidate sampling phases, assuming step 808 returns at least one "YES" signal. Step 812 includes selecting as the best sampling phase the candidate sampling phase corresponding to a largest one of the largest excessive converged filter coefficients.

In method 800, steps 802–807 taken alone may be considered an independent method of processing a received signal in a receiver. The further steps 808–812, and the repetition of steps 802–807 for different candidate sampling phases, are necessary to select a best sampling phase among a plurality of candidate sampling phases.

Method 800 selects a best sampling phase that maximizes the adaptive filter coefficients. Once method 800 selects the best sampling phase, transceiver 108 executes the channel diagnostic methods described above, such as methods 500–604, using the best sampling phase. Method 800 and methods 500–604 may be used alternately to continuously fine tune the sampling phase used in transceiver 108 and in channel diagnostic methods 500–604.

Figure 9:
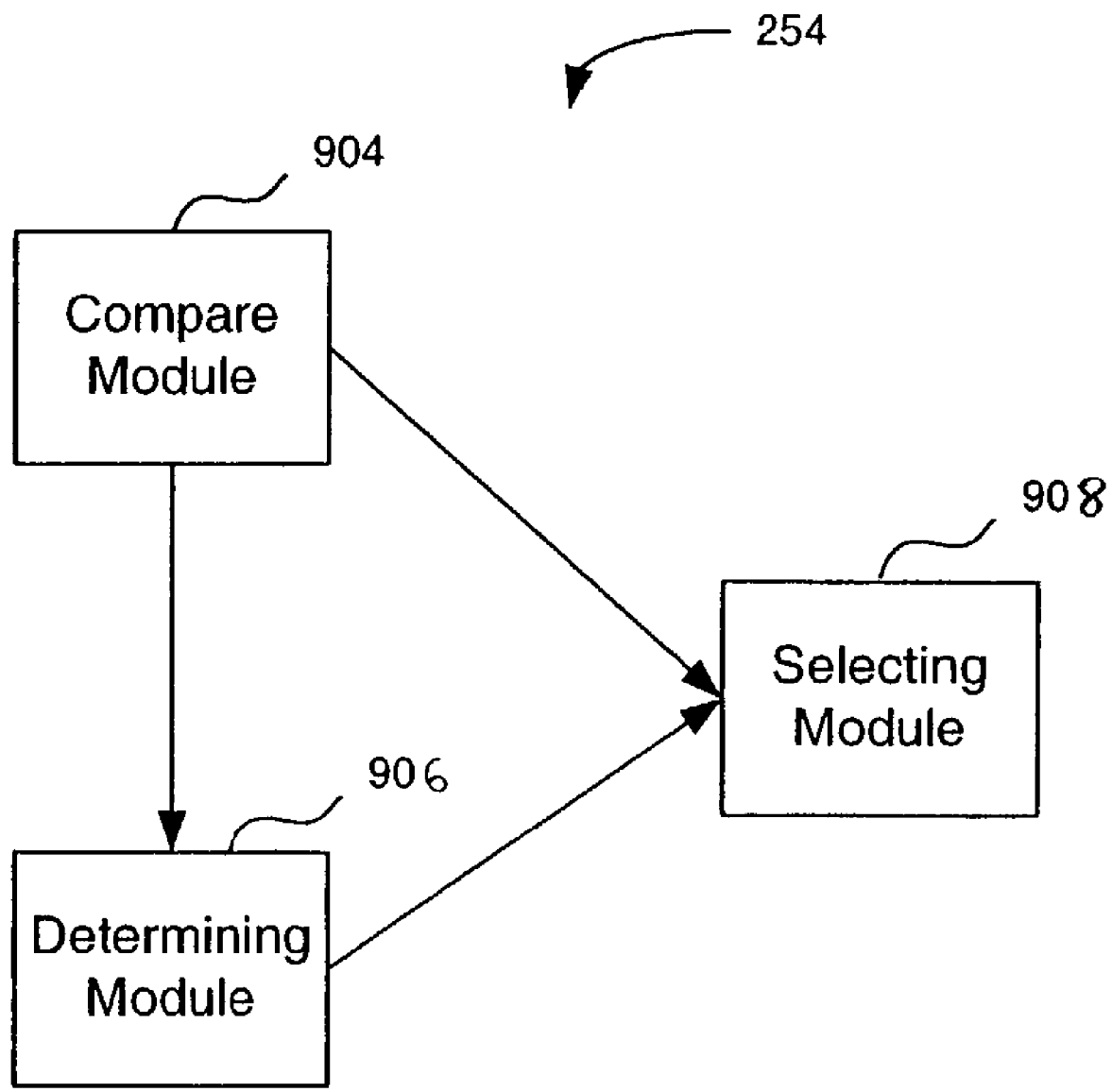
FIG. 9 is a block diagram of an example arrangement of a controller module used to implement portions of the method of FIG. 8.

FIG. 9 is a block diagram of an example arrangement of controller module 254, used to implement portions of method 800. Module 254 includes a compare module 904 for performing compare step 805 of method 800. Compare module 904 may include portions of compare module 750 discussed in connection with FIG. 7. Module 254 further includes a determining module 906 for performing steps 806 and 807. Module 254 also includes a select module 908 for performing step 812.

Threshold

Method 500 uses two main sets of filter coefficient thresholds stored in memory 250 to compare against the absolute values of the filter coefficients C. The first set of thresholds 260 indicative of channel faults (i.e., open/short thresholds 260) is used to determine the existence of and distance to a channel fault, while the second set of thresholds 262 indicative of channel length (i.e., length thresholds 262) is used to determine a channel length when no channel fault has been detected. Due to the nature of adaptive filter coefficients C, poor results may be obtained if all of the filter coefficients C are compared to a single threshold. This is due to the fact that filter coefficients C corresponding to larger tap numbers (and thus, larger time delay) tend to have smaller absolute values after they are properly converged. Thus, a set of thresholds including thresholds of different values is used in the present invention. For example, a staircase approach is used in the present invention for the open/short thresholds 260 and length thresholds 262. Filter coefficients C are divided into three or four groups, and each group has its own corresponding fixed threshold for open short thresholds 260 and length thresholds 262 each being somewhat smaller than the threshold for the previous group. Thus, the different threshold values follow a staircase of values.

Initial estimates for values of the open/short thresholds 260 and the length thresholds 262 for an Ethernet system have been determined using an exhaustive system and lab analysis of digital adaptive filtering of many actual twisted pair wires. This analysis has helped to determine that four (4) threshold groups in the open/short thresholds 260 are sufficient for the detection of channel faults. Three threshold groups in the length thresholds 262 are sufficient for the calculation of channel length. Furthermore, the analysis has given reasonable initial estimates for the sizes of each of the threshold groups, and the associated values corresponding to each threshold group. The initial estimates are shown in the following tables:

| INITIAL THRESHOLD GROUPS INDICATIVE OF CHANNEL FAULT | | | |
|---|---|---|---|
| OPEN/SHORT | FROM | TO | OPEN/SHORT THRESHOLDS 260 |
| GROUP 1 | 1 | 10 | 31232 |
| GROUP 2 | 11 | 20 | 17408 |
| GROUP 3 | 21 | 50 | 9984 |
| GROUP 4 | 51 | last | 3264 |
| | Coefficient Tap Numbers | | Coefficient Values (16-bit) |

TABLE 2

| INITIAL THRESHOLD GROUPS INDICATIVE OF CHANNEL LENGTH | | | |
|---|---|---|---|
| CHANNEL LENGTH | FROM | TO | LENGTH THRESHOLDS 262 |
| GROUP 1 | 1 | 10 | 5000 |
| GROUP 2 | 11 | 20 | 2500 |
| GROUP 4 | 21 | last | 400 |
| | Coefficient Tap Numbers | | Coefficient Values (16-bit) |

The reason the above values are called initial estimates is that method 500 has been implemented in systems that allow all the above values to be modified by the user. This allows fine-tuning of the thresholds in the tables during further testing and use.

Polynomials

In addition to the open/short thresholds 260 and the length thresholds 262 mentioned above, there are several other variables that can be fine-tuned by the user. These are the constants within the polynomial constant database stored in memory 248. For the channel fault distance calculation A*t+B=length, the variable A is called the Open/Short Polynomial (Py) Linear term, and B is called the Open/Short Polynomial Constant term, and A and B are contained in the set of constants 256 indicative of channel fault.

In the channel length calculation C*t+D=length, the variable C (not to be confused with filter coefficients C) is called the Channel Length Polynomial Linear term, and D is called the Channel Length Polynomial Constant term, and C and D are contained in the second set of constants 258 indicative of channel length.

Initial estimates for these terms are given in the following chart, along with example calculations:

TABLE 3

LENGTH CALCULATION POLYNOMIAL TERMS

| TERM | INITIAL ESTIMATE |
|---|---|
| Open/Short Py Linear term (A) | 0.87109 |
| Open/Short Py Constant term (B) | −6.0 |
| Channel Length Py Linear term (C) | 0.83594 |
| Channel Length Py Constant term (D) | −6.75 |

For example, when the tap number (t) is 72, the resulting channel fault distance is 0.87109*72−6.0, or approximately 57 meters.

When the tap number is 45, the resulting channel length is 0.83594*45−6.75, or approximately 31 meters.

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks and modules can be implemented by discrete components including digital and/or analog circuits, application specific integrated circuits, processors executing appropriate software, hardware, firmware and the like or any combination thereof. Thus, the breadth and scope of the present invention should not be limited by any of the above-described exemplary embodiments, but should be defined only in accordance with the following claims and their equivalents.

What is claimed is:

1. A method of analyzing a received signal received at a transceiver from a communications channel to determine a status of the communications channel, the communications channel coupling the transceiver to another transceiver in a communications system, the method comprising:
    (a) producing a sampled signal from the received signal using a candidate sampling phase;
    (b) converging filter coefficients of an adaptive filter within the transceiver receiving the received signal based on the candidate sampling phase;
    (c) comparing the converged filter coefficients to filter coefficient thresholds; and
    (d) determining, based on said comparing step (c), a largest filter coefficient among one or more excessive filter coefficients that exceed corresponding filter coefficient thresholds, whereby the largest filter coefficient exceeding the filter coefficient thresholds is used in determining the status of the communications channel.

2. The method of claim 1, further comprising:
    (e) repeating steps (a), (b), (c) and (d) using different candidate sampling phases, thereby determining one or more largest filter coefficients for one or more respective candidate sampling phases; and
    (f) selecting as a best sampling phase the candidate sampling phase corresponding to a largest one of all of the largest filter coefficients.

3. The method of claim 2, wherein the filter coefficient thresholds have different values.

4. The method of claim 3, wherein the filter coefficient thresholds follow a staircase of values.

5. The method of claim 1, wherein step (b) comprises:
    initializing the filter coefficients; and
    adapting the initialized filter coefficients to the sampled signal having the candidate sampling phase.

6. The method of claim 1, wherein the filter coefficients are open or short coefficients that correspond to the status of the communications channel being open or short.

7. In a first transceiver that produces a sampled signal from a received signal using a sampling phase, the received signal being received from a communications channel coupling the first transceiver and a second transceiver in a communications system, the first transceiver including an adaptive filter for processing the sampled signal to determine a status of the communications channel, the adaptive filter including adaptive filter coefficients, a method of selecting a best sampling phase to be used in the first transceiver, comprising:
    (a) producing the sampled signal using a candidate sampling phase;
    (b) converging the filter coefficients based on the candidate sampling phase;
    (c) comparing the converged filter coefficients to filter coefficient thresholds;
    (d) determining a largest filter coefficient among one or more excessive filter coefficients that exceed corresponding filter coefficient thresholds, when said comparing step (c) indicates that the one or more excessive filter coefficients exist;
    (e) repeating steps (a), (b), (c) and (d) using different candidate sampling phases, thereby determining one or more largest filter coefficients corresponding to one or more respective candidate sampling phases; and
    (f) selecting as the best sampling phase the candidate sampling phase corresponding to a largest one of all of the largest filter coefficients, whereby the largest filter coefficient exceeding the filter coefficient thresholds is used in determining the status of the communications channel.

8. The method of claim 7, wherein the filter coefficient thresholds include different thresholds, and step (c) comprises comparing each of the converged filter coefficients to a corresponding one of the different thresholds.

9. The method of claim 7, wherein step (b) comprises:
    initializing the filter coefficients; and
    adapting the initialized filter coefficients to the sampled signal having the candidate sampling phase.

10. A communications system including transceivers coupled together via a communications channel, the transceivers being configured to process a received signal signals to determine a status of the communications channel, each of the transceivers comprising:
    an analog-to-digital converter (ADC) configured to produce a sampled signal from the received signal using a candidate sampling phase;

an adaptive filter including adaptive filter coefficients, the filter being configured to receive the sampled signal and converge the filter coefficients based on the candidate sampling phase;

a memory for storing filter coefficient thresholds;

a controller including,
- a compare module configured to compare the converged filter coefficients to the filter coefficient thresholds, and
- a determining module configured to determine a largest filter coefficient among one or more excessive filter coefficients that exceed one or more corresponding filter coefficient thresholds, whereby the a largest filter coefficient exceeding the filter coefficient thresholds is configured to be used by the transceiver in determining the status of communications channel.

11. The communications system of claim 10, wherein the controller further includes:

means for causing the ADC, the adaptive filter, the comparing module, and the determining module to repeat their respective functions using different candidate sampling phases, whereby the determining module determines one or more largest filter coefficients corresponding to one or more respective candidate sampling phases; and a selecting module configured to select as a best sampling phase the candidate sampling phase corresponding to a largest one of all of the largest filter coefficients.

12. The communications system of claim 10, wherein the filter coefficient thresholds include different thresholds.

13. The communications system of claim 12, wherein the different filter coefficient thresholds have stepped values.

14. The communications system of claim 10, wherein the compare module is configured to compare each filter coefficient of the converged filter coefficients to a corresponding one of the different thresholds.

15. The communications system of claim 10, wherein the adaptive filter includes at least one of an adaptive echo canceller and an adaptive equalizer.

* * * * *

UNITED STATES PATENT AND TRADEMARK OFFICE
CERTIFICATE OF CORRECTION

PATENT NO. : 7,190,718 B2
APPLICATION NO. : 10/281992
DATED : March 13, 2007
INVENTOR(S) : Bui et al.

It is certified that error appears in the above-identified patent and that said Letters Patent is hereby corrected as shown below:

<u>Column 14</u>
Line 62, "process a received signal signals" should be replaced with --process received signals--.

<u>Column 15</u>
Line 13, "whereby the a largest" should be replaced with --whereby the largest--.
Line 16, "of communications" should be replaced with --of the communications--.

Signed and Sealed this

Nineteenth Day of August, 2008

JON W. DUDAS
*Director of the United States Patent and Trademark Office*